March 31, 1970   W. M. DE ANGELIS ET AL   3,503,415
BALL VALVE AND CONSTRUCTION THEREOF
Filed June 8, 1966   5 Sheets-Sheet 1
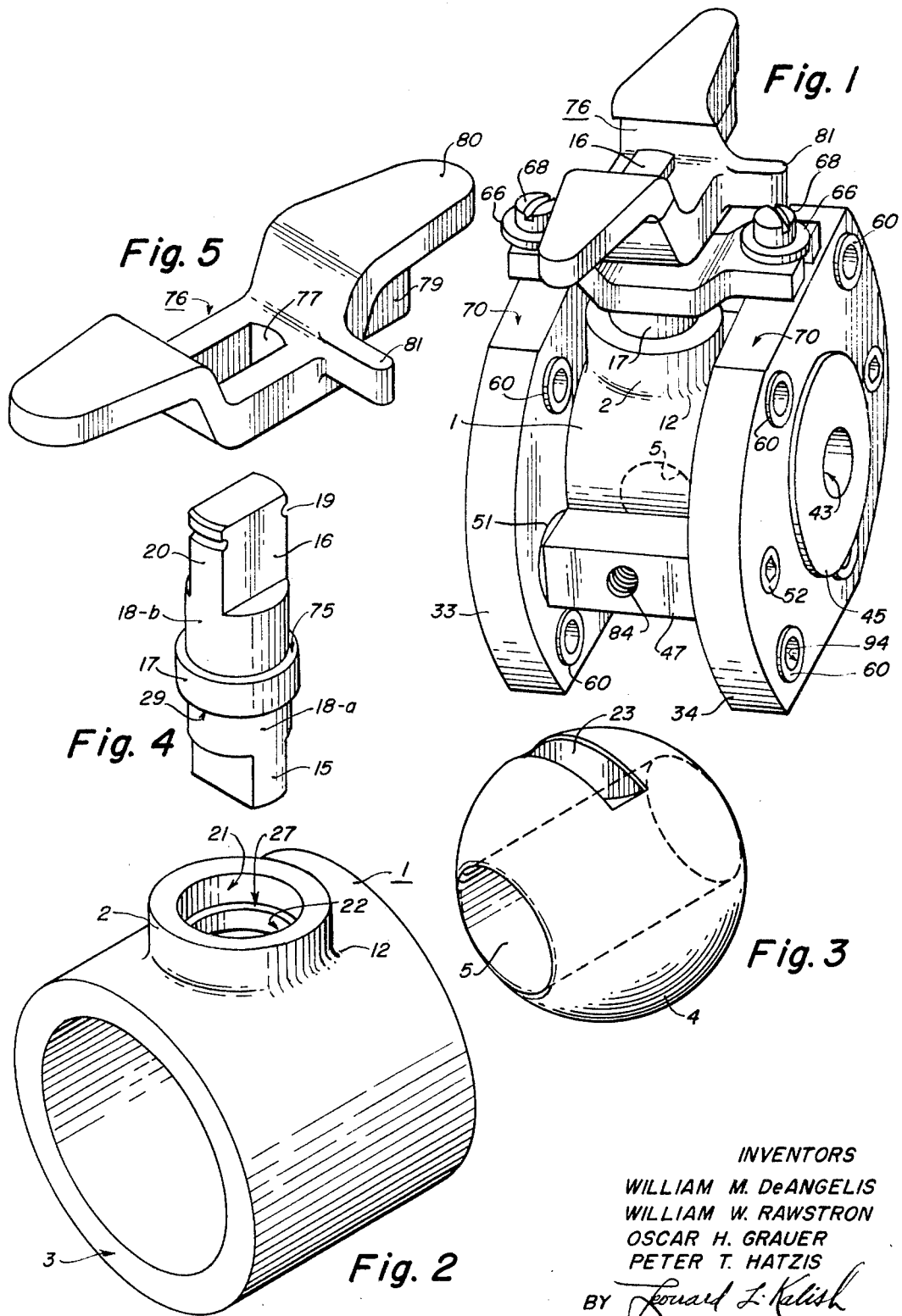
INVENTORS
WILLIAM M. DeANGELIS
WILLIAM W. RAWSTRON
OSCAR H. GRAUER
PETER T. HATZIS
BY Leonard L. Kalish
ATTORNEY.

March 31, 1970 — W. M. DE ANGELIS ET AL — 3,503,415
BALL VALVE AND CONSTRUCTION THEREOF
Filed June 8, 1966 — 5 Sheets-Sheet 2

INVENTORS
WILLIAM M. DeANGELIS
WILLIAM W. RAWSTRON
OSCAR H. GRAUER
PETER T. HATZIS
BY Leonard L. Kalish
ATTORNEY.

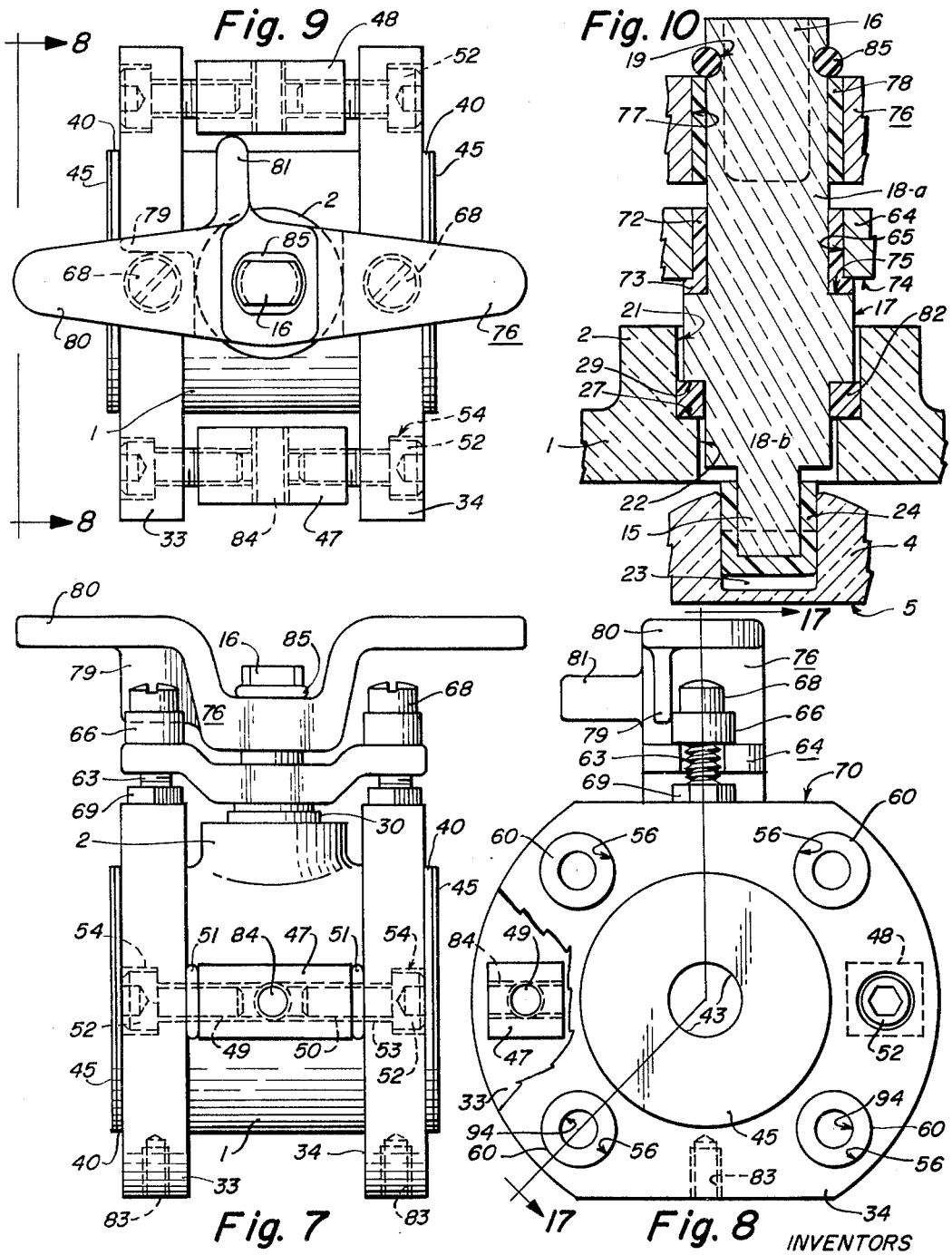

March 31, 1970  W. M. DE ANGELIS ET AL  3,503,415
BALL VALVE AND CONSTRUCTION THEREOF
Filed June 8, 1966  5 Sheets-Sheet 4
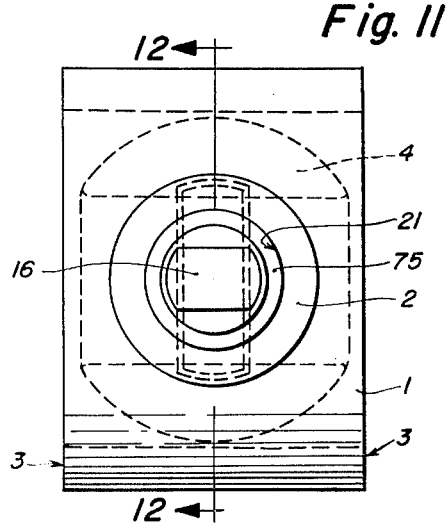
Fig. 11
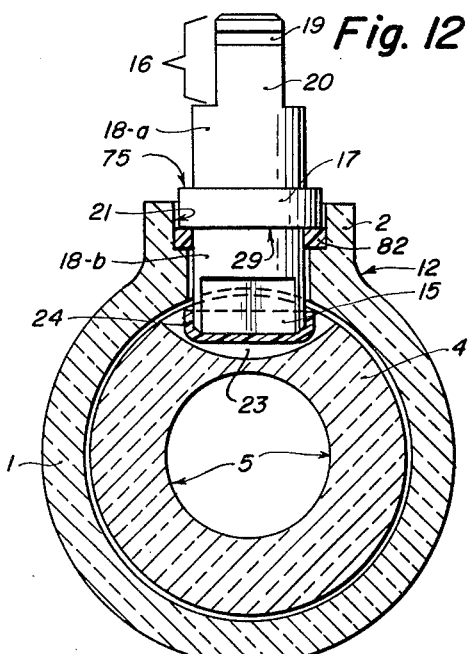
Fig. 12
Fig. 13
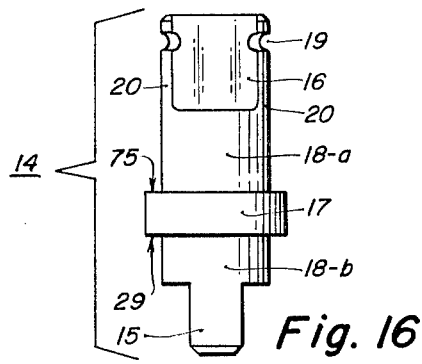
Fig. 16
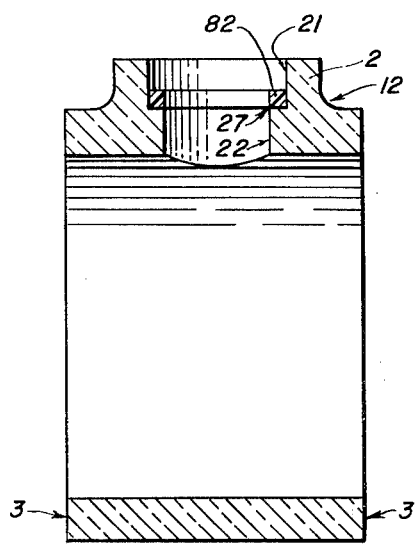
Fig. 14
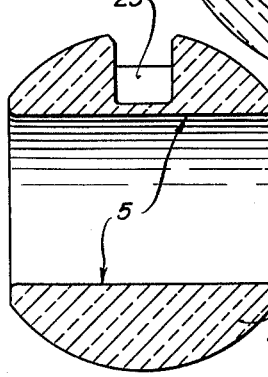
Fig. 15
INVENTORS
WILLIAM M. DeANGELIS
WILLIAM W. RAWSTRON
OSCAR H. GRAUER
PETER T. HATZIS
BY Leonard L. Kalish
ATTORNEY

INVENTORS
WILLIAM M. De ANGELIS
WILLIAM W. RAWSTRON
OSCAR H. GRAUER
PETER T. HATZIS
BY Leonard L. Kalish
ATTORNEY.

United States Patent Office 3,503,415
Patented Mar. 31, 1970

3,503,415
BALL VALVE AND CONSTRUCTION THEREOF
William M. DeAngelis, Wilton, Conn., William W. Rawstron, Northborough, Mass., and Oscar H. Grauer, Philadelphia, and Peter T. Hatzis, Dresher, Pa.; said DeAngelis, Grauer, and Hatzis assignors to Fischer & Porter Company, Warminster, Pa., a corporation of Pennsylvania
Continuation-in-part of application Ser. No. 538,771, Mar. 30, 1966. This application June 8, 1966, Ser. No. 556,071
Int. Cl. F16k 5/06, 31/60
U.S. Cl. 137—375    22 Claims

ABSTRACT OF THE DISCLOSURE

A glass ball-valve including a tubular glass valve-housing having a valve-stem-passage hole through the side wall thereof, a pair of oppositely facing sealing-rings of Teflon or the like in opposite ends of the bore of the valve-housing, a ball-like glass valve-member rotatably mounted and supported by the two sealing-rings out of contact with the valve-housing and having a fluid-passageway therethrough and having a valve-stem-keying socket therein, a metallic valve-flange at each end of the valve-housing, tie-bolts extending through the valve-flanges (but not through nor contacting the valve-housing) adjustably drawing the valve-flanges against the ends of the valve-housing and pressing the sealing rings against the valve-ball, an impact-resistant ceramic valve-stem extending through and revolvably in the valve-stem-passage hole and having an inner end keyingly telescoped into the socket in the valve-ball, a fluid-seal between the valve stem and the valve-stem-passage hole, a yoke extending across the valve-housing and overlapping the valve-flanges and having a stem-passage hole therein through which the valve-stem extends, and screws adjustably securing the ends of the yoke to the respective valve-flanges and exerting a variable axially inward force on the valve-stem.

---

The present application is a continuation-in-part of co-pending application Ser. No. 538,771, filed Mar. 30, 1966 (now abandoned).

The present invention relates to valves for use in fluid-lines in chemical processing apparatus and the like.

The object of the present invention is a chemically inert non-seizing or non-freezing valve which will be unaffected by acids, alkalies, solvents and other chemicals and may be operated at relatively high temperatures, namely, temperatures up to the order of about 400° F., and which will have a high degree of immunity to breakage due either to mechanical shock or thermal shock.

With these and other objects in view which will appear more fully from the following description and accompanying drawings, the valve of the present invention includes the following. A transparent tempered silicate-glass valve-housing comprising a short circularly cylindrical tubular body-portion having outer fire-glazed flat planar annular end-surfaces at a right-angle to its axis, with fire-chamfered inner and outer annular corners, and a short smaller-diametered tubular and circularly cylindrical tubular silicate-glass stem-mounting extension or bonnet-portion integrally fused to the body-portion at a point midway of its ends, with the axes of the body-portion and the bonnet-portion at a right-angle to each other and lying in the same plane. Bonnet-portion has a fire-glazed cylindrical bore with fire-chamfered inner and outer annular corners. A valve stem-passageway hole extends through the side-wall of the body-portion of the valve-housing co-axially with respect to the bore of the bonnet-portion, and has an inner diameter smaller than the inner diameter of the bore of the bonnet-portion. There is an outwardly facing fire-glazed annular sealing-seat or shoulder within the bonnet-portion, and such sealing-seat has a fire-chamfered inner annular corner. A ball-like silicate-glass valve-member, having a polished spherical outer surface and having a diametral fluid-passageway therethrough, is revolvably supported within the body portion by and between annular ball-supporting and sealing-rings operatively mounted in the ends of the body-portion of the valve-housing. The sealing rings are disposed at opposite sides of the ball-like valve-member. The ball supporting and sealing rings are formed of "Teflon," "Kel–F," "Halon" or the like. The axial length of the body portion of the valve-housing is not substantially greater and is preferably less than the outer diameter thereof and is only slightly greater in the diameter of the ball-like valve-member, namely, its axial length is the ball-diameter plus the axial distance required to accommodate the two sealing rings when deformed to their fluid-sealing shape or condition.

The valve of the present invention also includes two metallic valve-flanges, each having a fluid-passageway therethrough. One such valve-flange is juxtaposed to each end of the body-portion of the valve-housing and is also operatively juxtaposed to the sealing-ring in the end of the body-portion of the valve-housing. The body-portion of the valve-housing is compressively mounted between the valve-flanges, under axial compression, and press the sealing-rings against the valve-ball. Adjustable fasteners (such as headed bolts and nuts) are operatively interposed between the metallic valve-flanges. Such fasteners flank the body portion of the valve-housing but are clear of the outer surfaces of the body-portion thereof. These fasteners demountably and adjustably press the metallic valve-flanges and the discs of the below-described spool-like sealing members against the flat fire-polished ends of the body-portion of the valve-housing and maintain the body-portion of the valve-housing under axial compression.

The valve of the present invention further includes a thin-walled spool-like sealing member of "Teflon," "Kel–F," "Halon" or the like, operatively mounted to each of said metallic valve-flanges; the thicker-walled tubular portion of such spool-like sealing member extends through the fluid-passageway in the valve-flange and lines the wall of such fluid-passageway. Such spool-like sealing members have thinner walled end-discs of a diameter at least of the order of the outer diameter of the body-portion of the valve-housing. Such discs flank the opposite side-surfaces of the metallic valve-flange. A resilient gasket is interposed between each of the end-discs of the spool-like sealing members and the juxtaposed surfaces of the metallic valve-flange.

The stem-mounting extension or bonnet-portion of the valve-housing has a ceramic valve-stem sealingly and revolvably mounted therein. A stem-pressing yoke, detachably and adjustably secured to the two valve-flanges, is arranged to press the valve-stem into sealing relation with the fire-glazed annular sealing-seat formed on the body-portion of the valve-housing.

The present invention further consists of other constructional features and elements and of the method of making the valve-housing as will appear more fully from the following description and accompanying drawings.

In the accompanying drawings, like reference characters indicate like parts.

FIGURE 1 represents a perspective view of a valve constituting an embodiment of the present invention.

FIGURE 2 represents a perspective view of the transparent cylindrical glass valve-housing thereof.

FIGURE 3 represents a perspective view of the transparent glass ball-like valve-member thereof.

FIGURE 4 represents a perspective view of the ceramic valve-stem thereof.

FIGURE 5 represents a perspective view of the handle thereof.

FIGURE 7 represents a side elevational view of the valve embodying the present invention.

FIGURE 8 represents an end elevational view of the same.

FIGURE 9 represents a top plan view of the valve.

FIGURE 10 represents a vertical cross-sectional view through the stem-mounting extension or bonnet of the valve-housing and through the valve stem, showing another form of sealed mounting of valve-stem in the stem-mounting extension (different from that shown in FIGURE 6).

FIGURE 11 represents a top plan view of the transparent glass valve-housing of the ball-like valve member therein and of the valve stem.

FIGURES 12 and 13 represent cross-sectional views on line 12—12 of FIGURE 11; FIGURE 12, showing the open position of the ball-like valve members, and FIGURE 13 showing the closed position thereof.

FIGURE 14 represents a cross-sectional view of the valve-housing in a plane in which the main axis of the housing lies and in which the axis of the stem-mounting extension thereof also lies.

FIGURE 15 represents a cross-sectional view of the ball-like valve-member taken on a plane in which the axis of its fluid-passageway lies and which bisects the stem-receiving keying-slot in said ball-like valve-member.

FIGURE 16 represents an elevational view of the ceramic valve-stem.

FIGURE 17 represents an elevational view, partly in cross-section, of the glass ball-valve of the present invention operatively mounted in a glass pipe-line.

FIGURE 18 represents a fragmentary cross-sectional view of the glass ball-valve showing a modified form of construction FIGURE 18 represents a fragmentary vertical cross-sectional view of the valve of the present invention, with the valve-ball shown in its closed position.

Figure 6:
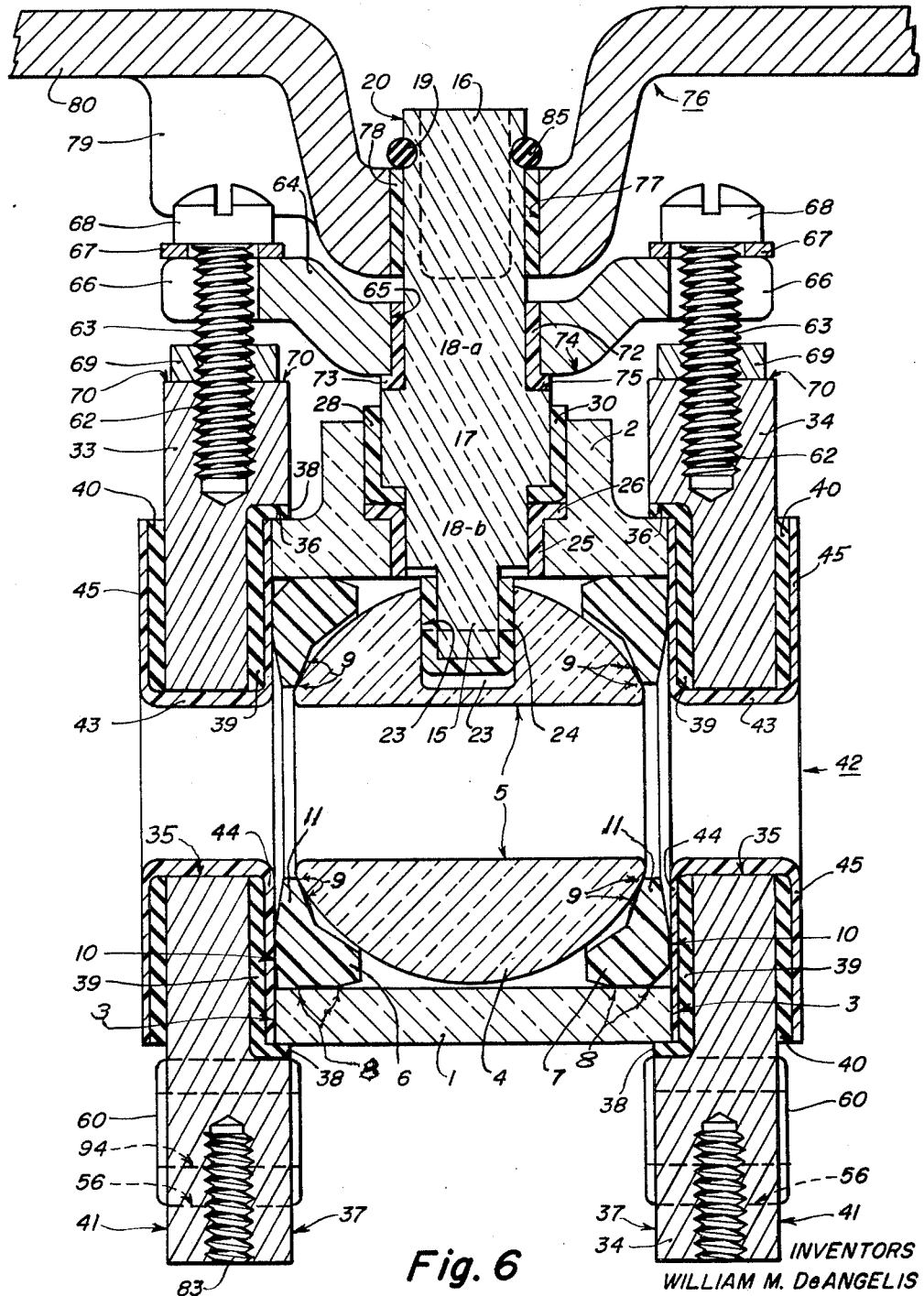
FIGURE 6 represents an enlarged vertical cross-sectional view of said valve taken on a plane in which the axis of the valve-stem and the axis of the valve-housing lie; with the ball-like valve member and the handle and valve-stem in the "open" position.

The ball valve of the present invention includes a valve-housing of transparent tempered boro-silicate glass having a relatively low coefficient of thermal expansion and contraction; the valve-housing comprising a circularly cylindrical tubular body-portion 1 and a circularly cylindrical tubular stem-mounting extension or bonnet-portion 2 integrally fused thereto at a point midway of its ends and with its axis at a right-angle to the axis of the body portion 1 and lying in the same plane therewith. The body-portion 1 of the valve-housing has a pair of opposed flat planar fire-glazed annular end-surfaces 3 at a right angle to its axis.

The wall-thickness of body portion 1 of the valve-housing is of the order of one-seventh to one-twelfth of its outer diameter. Thus, for example, with the body portion of the valve-housing having an outer diameter of two inches (2"), its wall-thickness would be of the order of 0.215", and with the body portion 1 of the valve-housing having an outer diameter of three-and-a-quarter inches (3¼"), its wall-thickness would be of the order of 0.275". The wall-thickness of the bonnet 2 is slightly less, as for instance, of the order of 0.190" in the first example and of the order of 0.245" in the second example.

A ball-like transparent boro-silicate glass valve-member 4, having a polished spherical surface and having a diametral fluid-passageway 5 therethrough, is rotatably mounted in the body portion 1 of the valve-housing, between opposite annual sealing rings 6 and 7 which form annular fluid-seals, at 7, with the inner cylindrical surface or bore of the valve-body 1 and form an annular fluid-seal, at 9, with the outer spherical surface of the ball-like valve member 4 when pressed axially inwardly along the flat planar annular pressing-and-sealing surfaces 10 thereof. The diameter of the ball-like valve-member is slightly less than the inner diameter of the valve-body 1. The ball-like valve-member 4 is supported within the cylindrical bore of the valve-body 1 without any contact with the cylindrical bore thereof. The annular sealing surfaces 9 of the rings 6 and 7 are at a radius from the axis of the fluid-passageway 5 such that when the valve-ball 4 is rotated 90° about its vertical axis (as shown in FIGURE 6), such annular sealing surface 9 will be in contact, throughout their annular extent, with a portion of the outer spherical surface of the valve-ball in each of the two terminal positions of the valve-ball.

The tubular glass stem-mounting extension or bonnet-portion 2 is formed of the same glass as that of which the body portion 1 of the valve-housing is formed, and is fused to said body portion with an external fillet 12 extending around the base of the bonnet portion 2.

The valve-stem, designated generally by the reference-numeral 14, and separately shown in FIGURES 4 and 16, formed of a highly compacted and dense fused alumina or other impact-resistant ceramic, and is provided with a flat inner keying end portion 15, an outer flat handle-receiving portion 16, a flange 17 of a diameter greater than that of the main body portions 18–a and 18–b thereof, and a ring-receiving groove 19 in the cylindrical portions 20 intermediate to the outer flats 16.

The bonnet 2 of the valve-housing has a cylindrical bore 21 of a diameter slightly greater than the outer diameter of the flange 17 of the valve-stem 14, so that a radial clearance is formed between the outer cylindrical periphery of the flange 17 of the valve-stem and the inner cylindrical bore 21 of the bonnet 2. A cylindrical hole 22, co-axial with the bore 21 of the bonnet 2, extends through the cylindrical wall of the valve-body 1; said hole 22 being of a diameter less than the diameter of the lower cylindrical portion 18–b of the valve-stem 14, so as to provide a radial clearance between the valve-stem portion 18–b and the wall of the hole 22.

A keying slot 23 is formed in the valve-ball 4, as indicated particularly in FIGURES 3 and 15. The valve-stem 14, mounted in the bore 21 of the bonnet 11 and in the stem-passage hole 22 of the valve-body 1, has its inner flat end 15 nested in the keying slot 23 as indicated in FIGURES 6, 12 and 13, with a clearance between parallel flat walls of said slot and the parallel flat sidewalls of said flat stem-portion 15. A sleeve or boot 24, formed of "Teflon," "Kel-F" or "Halon" or the like is disposed in such clearance. The sleeve 24 has a horizontal cross-section (as viewed in FIGURES 6, 12 and 13) generally of the same shape as the horizontal cross-section of the inner flat end-portion 15 of the valve-stem 14, and is operatively interposed between said flat keying portion 15 of the valve-stem 14 and the key-slot 23, and acts as a shock insulator and absorber and also as an abrasion insulator and absorber between the valve-ball 4 and the fused alumina valve-stem 14.

In one embodiment (shown in FIGURE 6) a thin-walled inverted hat-shaped or sleeve-and-washer shaped fluid-sealing and shock insulating and absorbing member 25 of "Teflon," "Kel-F" or "Halon" or the like is operatively interposed between the lower cylindrical portion 18–b of the valve-stem 14 and the wall of the hole 22; with the flange-like washer portion 26 thereof overlapping and bearing downwardly against the annular sealing shoulder 27 intermediate the bore 21 of the bonnet 2 and the hole 22 through the side-wall of the valve-body 1.

The radial thickness of the cylindrical wall of the sleeve 25 is such as not fully to take up radial clearance between the lower cylindrical portion 18–b of the valve-stem 14 and the bore 22, but so as to form a smooth running fit between the cylindrical portion 18–b of the valve-stem and the inner cylindrical surface of the sleeve 25 and to give the valve-stem a radial support or guidance.

In the embodiment shown in FIGURE 6, a generally cup-shaped sleeve-and-washer member 28 of "Teflon," "Kel-F" or "Halon" or the like is operatively interposed between the flange 17 of the valve-stem 14 and the bore 21 of the bonnet 2 of the valve-housing and between the downwardly facing shoulder 29 of the flange 17 of the valve-stem 14 and the upper surface of the flange 26 of the hat-shaped sleeve-and-washer member 25. The radial thickness of the sleeve portion 30 of the member 28 is such as to provide a smooth running fit between the inner cylindrical surface thereof and the cylindrical outer surface of the flange 17 of the valve-stem. The inwardly-turned flat ring or washer portion 31 of the member 28 seats against the washer portion 26 of the hat-shaped member 25, with a running fit therewith.

Metallic valve-flanges 33 and 34 are operatively juxtaposed to the flat ends 3 of the cylindrical glass-body 1, as indicated in FIGURES 6, 7 and 9. Each of the metallic valve-flanges 33 and 34 is provided with a fluid-passageway 35 therethrough.

A shallow cylindrical recess or counter-bore 36 is provided in the inner faces 37 of the valve-flanges 33 and 34. The diameter of each such recess or counter-bore 36 is sufficiently greater than the outer diameter of the cylindrical glass valve-body 1 so as to provide an annular radial clearance between the ends of the glass valve-body 1 (which are telescoped into said recesses 36) and the walls of such recesses 36.

A resilient shock absorbing or insulating washer or gasket 39 is nested in each of the recesses 36, having an outer flange-like portion 38 extending into the clearance between the counter-bore 36 and the outer surface of the glass valve-body 1 telescoped thereinto. The washers 39 are formed of a resilient rubber-like material such as neoprene or the like. A similar resilient washer 40 (but without the aforementioned flange provided on washer 39) is placed against the outer surface of each of the metallic valve-flanges 33 and 34, as indicated in FIGURE 6.

A generally form-retaining U-cross-sectioned gasket or spool-like fluid sealer and insulator, designated generally by the reference-numeral 42, formed of "Teflon," "Kel-F" or "Halon" or the like, is operatively mounted to the metallic valve-flanges 33 and 34 and to the resilient shock-absorbing washers 39 and 40 thereof, as indicated particularly in FIGURE 6, with the thicker-walled tubular hub-portion 43 thereof and nested in the fluid-passageway 35 of the valve-flanges 33 and 34 and forming a liner therefor, and with the thin inner disc 44 thereof adjacent the inner washer 39 and with the thin outer disc 45 thereof adjacent the outer washer 40; the discs 44 and 45 being integral with the hub-portion 43 of the spool-like member 42 and being molded or otherwise shaped to lie flat against the washers 39 and 40, respectively.

Nut-like screw-receiving flange-coupling blocks 47 and 48 are operatively disposed between the inner faces 37 of the metallic valve-flanges 33 and 34, as indicated in FIGURES 1, 7, 8 and 9; the distance between the opposite ends of said blocks 47 and 48 being sufficiently less than the distance between the inner faces 37 of the valve-flanges 33 and 34 (when said flanges are operatively drawn to each other so as to place the glass housing 1 under axial compression) to accommodate the resilient O-rings 51 indicated particularly in FIGURES 7 and 9; said O-rings having a cross-sectional area such that they will be substantially compressed when the flanges 33 and 34 are drawn tight against the ends of the glass housing 1, without however significantly interfering with or diminishing the axial pressure which the valve-flanges 33 and 34 exert upon the flat annular end surfaces 3 of the cylindrical glass valve-body 1 when said valve-flanges are operatively fastened to each other through the blocks 47 and 48 and the headed Allen screws 52 extending into the co-axial threaded holes 49 and 50 in said blocks 47 and 48 and through the pipe-coupling bolts 57 as indicated particularly in FIGURES 7, 9 and 17.

At diametrically opposite points thereof, the valve-flanges 33 and 34 are provided with thread-clearance holes 53 and co-axial head-clearance recesses 54, through which the headed Allen screws 52 extend, with their inner ends threaded into the co-axial threaded holes 49 and 50 in the blocks 47 and 48 and tightened therein sufficiently to draw the flanges 33 and 34 towards each other and to exert axial compressive force against flat planar ends 3 of glass valve-body 1 and also to exert axial pressure between the outwardly-facing annular surfaces 10 of the sealing-rings 6 and 7 and the juxtaposed and contiguous portions of the inner faces of the spool-discs 44, sealingly to deform the ball-supporting sealing-rings 7 and 8 and to press them into fluid-sealing engagement with the spherical surface of the glass valve-ball 4 and into fluid sealing engagement with the inner cylindrical bore or surface of the valve-body 1.

Bushings 60 of "Teflon," nylon or the like are press-fitted into the bolt-holes 56 to serve as shock absorbers or insulators between the bolts 57 and the metallic valve-flanges 33 and 34.

A threaded hole 62 is provided at the top of each of the flanges 33 and 34 as indicated in FIGURES 6 and 8, for the reception of the threaded stems of the headed yoke-screws 63.

A stem-pressuring yoke 64, having a stem-passage or stem-journaling hole 65 therethrough and having opposite screw-clearance slots or recesses 66 extending radially inwardly from the outer ends thereof, bridges the valve-flanges 33 and 34 and has its slotted or recessed ends overhanging said valve-flanges, as indicated particularly in FIGURES 6, 7, 9 and 17. The headed yokescrews 63 extend through the slots of recesses 66 and are threaded into the holes 62, with a washer 67 intermediate the screw head 68; said washers 67 bridging the slot 66. The washers 67 may be relatively thin as indicated in FIGURE 6 or relatively thick as indicated in FIGURES 7 and 8. A lock-nut 69 is operatively disposed on the threaded shank of each of the screws 63, and is tightened against the upper flat surface 70 of the valve-flanges 33 and 34, as indicated particularly in FIGURES 6, 7 and 8, for locking the screws 63 in their adjusted position.

A generally hat-shaped shock absorber of nylon or the like, designated generally by the numeral 72, is operatively interposed between the journal-bore 65 of the yoke 64 and the upper cylindrical portion 18–a of the valve-stem 14 so as to give the latter radial bearing support with a running fit; with the outwardly extending flange-like portion 73 thereof operatively interposed between the bottom surface 74 of the yoke 64 and the upwardly-facing surface 75 of the flange 17 of the stem 14.

While the lock-nuts 69 are in their unlocking positions, the screws 63 are tightened until sufficient axial pressure is exerted between downwardly facing shoulder 29 of the valve-stem 14 and the upwardly facing shoulder 27 of the glass valve-body 1 and the sealing gasket (or gaskets) therebetween, to obtain the necessary fluid-tight seal commensurate with the fluid pressure under which the valve is to be operated, while yet permitting a smooth running fit therebetween. When the yoke 64 has been so adjusted by means of the screws 63, the lock-nuts 69 are tightened down against the upwardly-facing surfaces 70 of the valve-flanges 33 and 34.

The two-winged handle designated generally by the numeral 76 and having a generally central stem-receiving bore 77, is mounted on the flattened upper end 16 of the valve-stem 14 in the manner indicated in FIGURES 1, 6, 7, 8 and 9, with a shock-absorbing sleeve 78 of nylon or the like operatively disposed in the clearance between the stem-receiving hole 77 of the handle 76 and the upper flat end 16 of the valve-stem 14. A resilient O-ring 85 of neoprene or the like is snapped into the ring-receiving groove 19 at the upper end of the valve-stem 14, to prevent the handle 76 from being pulled off the stem.

The handle 76 is provided with a stop web or portion 79 extending downwardly from the wing 80 thereof, which serves as a stop against the head 68 of one of the two yoke-screws 63 or against the corresponding washers 67, to delineate the open position of the valve indicated in FIGURES 6, 7, 8, 9, 11 and 12. A stop-projection 81 is provided on the handle 76 (integrally therewith) for forming a stop against the other screw-head 68 or washer 67 for delineating the closed position of the valve indicated in FIGURES 1 and 13.

In the modified embodiment shown in FIGURES 10, 12 and 13 a single sleeveless sealing washer 82 (or several superimposed sleeveless sealing washers) is operatively interposed between the facing shoulders 27 and 29; with the inner and outer cylindrical surfaces of said washer bearing against the juxtaposed cylindrical portion 18–a of the valve-stem and the cylindrical bore 21 of the bonnet 2 with a neat running fit, to provide radial guidance and bearing-support for the valve-stem 14.

A threaded hole 83 is provided in each of the valve-flanges 33 and 34 and a similar transverse threaded hole 84 is provided in each of the flange-connecting blocks 47 and 48, for receiving valve-supporting or valve-mounting screws by which the valve may be mounted to or supported by a valve-panel or an instrument-panel or by which the valve may be mounted to or supported by a pipe-hanger or pipe-bracket or other support.

The valve-housing (composed of body-portion 1 and bonnet-portion 2) is made of a tempered silicate glass, and preferably one having a low coefficient of thermal expansion and contraction, as, for example, a boro-silicate, in which the outer surface-layers of the valve-housing are under compression or under compressive stresses while the interior portions or inner layers thereof are under tension or tensional stresses. Insofar as the coefficient of thermal expansion or contraction is a criterion of the glass of the valve-housing 1, such coefficient of thermal expansion or contraction is of the order of 30 to 60 times 10 to the minus 7th power per centimeter per centimeter per degree centigrade (30 to $60 \times 10^{-7}$/cm./cm./° C.) but preferably about $32 \times 10^{-7}$/cm./cm.° C.

The ball-like valve member 4 is made of untempered boro-silicate glass.

The valve shown in FIGURES 1, 6–9 and 17 is operatively mounted between the enlarged coupling-ends 86 of the glass pipes 87; the annular end-surfaces 88 of such glass pipes being sealingly pressed against the outer spool-discs 45 of the valve by means of the metallic pipe-flanges 89 and the very slightly resilient radially-split conical rings or sleeves 90 of plastic-bonded compressed asbestos or the like, as, for instance, long-fiber asbestos bonded with about 12% styrene butadiene, which sleeves 90 are operatively interposed between the conical bores 91 of the pipe-flanges 89 and the outer conical bearing surfaces 92 of the coupling-ends 86 of the glass pipes 87. The flange-tie-bolts 57 extend through clearance holes 93 in the pipe-flanges 89 and through the clearance holes 94 in the shock-absorbing bushings 60 in the valve-flanges 33 and 34 and have nuts 95 threaded onto the outer ends thereof, as indicated in FIGURE 17.

In assembling the ball-valve shown in FIGURES 1, 6–9 and 17 the Allen screws 52 are tightened sufficiently to place the body-portion 1 of the glass valve-housing under some axial compression but preferably substantially short of the ultimate axial compression imposed on the glass body-portion 1 when the ball-valve is operatively mounted between the two glass pipes 87 in the manner here indicated. Indeed, the Allen screws 52 may be tightened just sufficiently to maintain the valve-flanges 33 and 34 in assembled relation to the glass valve-housing 1 and 2.

Only when the valve is mounted between the enlarged coupling-ends 86 of the glass pipes 87, in a manner indicated in FIGURE 17, is the body-portion 1 of the glass housing put under the ultimate axial compression required for affecting the fluid-seals referred to hereinabove by fluid-sealing forces commensurate with the fluid-pressure under which the pipe system is to operate, as, for instance, 100 to 150 pounds per square inch (more or less).

Thus, when the ball valve is mounted in a glass pipe-line in the manner indicated in FIGURE 17, the nuts 95 are preferably tightened by an adjustable torque-wrench and each nut tightened to the same extent, and sufficient to form a fluid-seal (commensurate with the operating fluid-pressure) between the end bearing surfaces 88 of the pipe-ends 86 and the outer spool-discs 45 of the valve and between the inner spool-discs 44 thereof and the glazed flat planar ends 3 of the body-portion 1 of the glass valve-housing and between the spherical surfaces of the glass valve-ball 4 and the annular contact zone 9 of the ball-supporting and sealing rings 6 and 7 and between the flat annular surfaces 10 of said rings 6 and 7 and the inner spool-discs 44 and between the annular sealing surfaces 8 of said rings 6 and 7 and the cylindrical bore of the body-portion 1 of the glass valve-housing.

In FIGURE 17 a modified form of construction is shown in respect to the glass-centering and shock-absorbing cylindrical sleeve. Thus, instead of providing the glass-centering and shock-absorbing sleeve-like annular flanges 38 as a part of the inner resilient gaskets 39 (as in FIGURE 6), similar sleeve-like glass-centering and shock-absorbing flange-portions 41 may be formed on and as parts of the inner spool-discs 44 as indicated in FIGURE 17. Moreover, separate annular glass-centering and shock-absorbing sleeve-like members or ring-like members (similar to sleeve-like portions 38 or 41) can also be provided in lieu of having same formed integrally with the washers 39 of spool-discs 44, as, for instance, the resilient O-rings 46 of neoprene or the like shown in FIGURE 18, which are of suitable originally circular cross-section and deformed to an oval cross-section when the annular clearances between the inner diameters of the recesses or counter-bores 36 (in the valve-flanges 33 and 34) and the outer diameters of the ends of the body portion 1 of the glass valve-housing which are telescoped into said recesses 36—thereby similarly centering the ends of the tubular body-portion 1 or of the glass valve-housing within said recesses 36—such O-rings likewise serving as a shock-absorber between such glass ends and the cylindrical side-walls of recesses 36.

The annular ball-sealing surfaces 9 of the ball-supporting sealing-rings 6 and 7 are radially inwardly of the annular flange-sealing surfaces 10 thereof, so that the axial force exerted upon said sealing-rings 6 and 7 by the valve-flanges 33 and 34 through the annular surfaces 10 thereof tends to bend the cross-section of the sealing-rings. Furthermore, in the closed position of the valve-ball 4 (as shown, for instance, in FIGURE 13) same annular portion of the innermost annular lip 11 of the sealing-rings 6 and 7 also contacts and seals against the outer spherical surface of the valve-ball 4.

The spool-like gaskets 42 and the ball-supporting sealing-rings 6 and 7, and preferably also the members 24, 25, 28 and 82, are formed of a solvent-resistant and chemically inert generally form-retaining and generally non-wetting synthetic resin or "plastic" having mechanical and chemical stability at relatively high temperatures (at least to 300° F. and preferably to 500° F.) without melting or softening and without chemical or physical deterioration, and capable of slight resilient deformation or yieldability under mechanical pressure and of recovering from small deformations after the deforming force is removed and capable of forming a dry or unlubricated non-seizing stationary and slidable fluid-seal with a matchingly-shaped glazed vitreous surface when pressed thereagainstin a self-lubricating relationship therewith and of conforming to such surface. The preferred synthetic resins (or plastics) are the polymerized fluorocarbons exemplified by the polymerized polytetra haloethylene or polymerized polytetrafluoroethylene resins described in U.S. Patent 2,230,654 (Roy J. Plunkett) issued Feb. 4, 1941 and marketed under the trademark "Teflon" and the polymerized polytrifluorochloroethylene resins marketed under the trademark "Kel-F," and also fluorinated ethylene-propylene resins marketed under the trademark or trade-designation "F.E.P. Teflon" and "Teflon 100." Other polymerized fluoro carbons or halo carbons may also be used, as, for instance, the "Halon" referred to hereinabove.

The bushings 60 are adapted to be removed, so as to provide the larger bolt-clearance-holes 56, when it is desired to use the valve between a pair of A.S.A. flanges (as distinguished from the glass-pipe-flanges 89 shown in FIGURE 17).

Having disclosed embodiments of the invention, the following is claimed:

1. A valve including a relatively short generally circularly cylindrical tubular glass valve-housing open at its opposite ends, the interior of said valve-housing constituting a valve chamber, a valve-stem-passage hole extending through the sidewall of said valve-housing, a pair of oppositely facing ball-supporting sealing-rings operatively disposed in the opposite ends of the bore of said valve-housing, said sealing-rings formed of a generally form-retaining and generally non-seizing and generally chemically-inert and solvent-resistant resin-like material having substantial chemical and physical stability and capable of being resiliently deformed under pressure and of forming an unlubricated fluid-seal with a matchingly-shaped glazed vitreous surface when pressed thereagainst, said ball-supporting sealing-rings having axially outwardly facing pressure-receiving and fluid-sealing annular surfaces and axially inwardly facing sphere-sealing annular surfaces and radially outwardly facing bore-sealing cylindrical annular surfaces, a generally spherical ball-like glass valve-member rotatably mounted between and supported by said ball-supporting sealing-rings out of contact with the bore of said glass valve-housing, said ball-like valve-member having a fluid-passageway therethrough and having valve-stem-keying means, a non-metallic corrosion resistant and impact-resistant valve-stem operatively extending through said stem-passage-hole in the wall of the valve-housing and having an inner keying end which is keyingly telescoped with the keying means of said ball-like valve-member for rotating the latter about an axis generally coincident with the axis of the valve-stem and generally at a right angle to the axis of such valve-housing, an outwardly facing annular sealing-seat surrounding the stem-passage-hole in said valve-housing and an operatively juxtaposed annular sealing-seat on said valve-stem and an annular stem-sealing member operatively interposed between said two sealing-seats, a valve-flange in operative juxtaposition to each end of said valve-housing and having a fluid passageway therethrough generally co-axial with said valve-housing, adjustable fastener means external to and independent of said valve-housing for pressing said flanges against the opposite ends of the valve-housing and for maintaining said valve-housing under axial compression and for pressing said flanges against the ball-supporting sealing-rings within said valve-housing so as to form a fluid-seal between said flanges and the ends of said valve-housing and for forming a fluid-seal between said flanges and said ball-supporting sealing-rings and for forming a fluid-seal between said ball-supporting sealing-rings and the spherical surface of the aforementioned ball-like valve-member and for forming a fluid-seal between the aforementioned ball-supporting sealing-rings and the cylindrical bore of said valve-housing, a yoke extending across and in operative alignment with said stem-passage-hole in the valve-housing and having a stem-passage-hole therein through which said valve-stem extends, said yoke bridging across said pair of flanges, and fastener means for adjustably securing the ends of said yoke to the respective flanges for exerting a variable axially inward force upon said valve-stem.

2. A valve according to claim 1, including a recess in each of the flanges facing the ends of the valve-housing, each such recess having a flat planar surface facing the end of the valve-housing and facing the bore of said valve-housing; the ends of said valve-housing being telescoped into said recesses and being generally centered thereby.

3. A valve according to claim 1, including radially-acting shock-absorbing centering means operatively interposed between the ends of the valve-housing and the juxtaposed flanges.

4. A valve according to claim 1, in which the axial length of the valve-housing is not substantially greater than its outer diameter.

5. A valve according to claim 1, in which the axial length of the valve-housing is less than its outer diameter.

6. A valve according to claim 1, including a radially-acting shock-absorber operatively interposed between the valve-stem and the valve-housing.

7. A valve according to claim 1, including a radially-acting shock-absorber operatively interposed between the stem-passage-hole in the yoke and the valve-stem.

8. A valve according to claim 1, including a handle on the outer end of the valve-stem and a shock-absorber operatively interposed between said end of the valve-stem and said handle.

9. A valve according to claim 1, including a shock-absorber between the valve-stem-keying means of ball-like valve-member and the inner keying end of the valve-stem.

10. A valve according to claim 1, in which the valve-stem is formed of fused alumina.

11. A valve according to claim 1, in which the valve-housing is formed of a tempered silicate glass.

12. A valve according to claim 1, in which the valve-housing is formed of a tempered boro-silicate glass.

13. A valve accordilng to claim 1, in which the valve-housing is formed of a glass having a relatively low coefficient of thermal expansion and contraction.

14. A valve according to claim 1, in which the wall-thickness of the valve-housing of the order of a seventh to a twelfth of the outer diameter thereof.

15. A valve according to claim 1, including two generally U-cross-sectioned spool-like fluid-sealing members formed of generally form-retaining chemically inert and solvent resistant synthetic resin, each spool-like member including a tubular-hub-like portion and two end discs, one of said spool-like members being operatively disposed in relation to each of the valve-flanges, with the tubular hub-like portion thereof disposed in the fluid-passageway of the valve-flange and with the end-discs thereof flanking the opposite faces of the valve-flange, each of the inner discs having a flat planar portion facing the corresponding end of the valve-housing and also facing the bore of the valve-housing.

16. A valve according to claim 15, including a resilient gasket intermediate each of the discs of the spool-like member and the juxtaposed face of the flange.

17. A corrosion resistant valve comprising a valve-body of corrosion resistant material having a through-passage and having a side-opening, a ball mounted in said through-passage of the valve-body and also having a through-passage, said ball being rotatable between an open position in which its through-passage is aligned with that of the valve-body and a closed position, a valve-stem extending through said side-opening of the valve-body and having its inner end detachably keyed to said valve-ball, said valve-stem having an outer shoulder surface outside said valve-body, a pair of valve-flanges, one disposed at either end of said valve-body, said valve-flanges having openings aligned with said body passage, a pair of corrosion resistant gaskets of U-shaped cross-section each embracing one of said valve-flanges around the opening therein, each U-cross-sectioned gasket having a first side-wall portion disposed between the respective valve-flange and adjacent end of the body, tie members connecting said valve-flanges together, and a yoke bearing on said shoulder and secured to said valve flanges.

18. A valve as described in claim 17, having resilient washers disposed between said first side-wall portions of said U-cross-sectioned gaskets and said body.

19. A valve as described in claim 17, said U-cross-sectioned gaskets each having a second side-wall portion disposed outside the valve-flanges and adapted to receive the ends of pipes connected thereto, and a second pair of resilient washers, each disposed between one of said second side-wall portions of said U-cross-sectioned gaskets and the respective valve-flange.

20. A valve as described in claim 17, having resilient washers disposed between each of second side-wall portions of said U-cross-sectioned gaskets and the valve-flanges embraced by said gaskets.

21. A valve including a silicate-glass valve-housing having a larger-diametered relatively short generally circularly cylindrical tubular body-portion open at its opposite ends and a smaller-diametered generally circularly cylindrical tubular valve-stem-mounting bonnet-portion integrally fused to said body-portion and at a right-angle thereto and with its axis lying in the same plane as that in which the axis of the body-portion lies, the interior of said larger diametered body-portion constituting a valve-chamber, a valve-stem-passage hole through the wall of said body-portion of said valve-housing coaxial with the bore of said bonnet-portion, a pair of oppositely facing ball-supporting sealing-rings operatively disposed in the opposite ends of the bore of said larger-diametered body-portion, formed of a generally form-retaining and generally non-seizing and generally chemically-inert and solvent-resistant resin-like material having substantial chemical and physical stability and capable of being resiliently deformed under pressure and of forming an unlubricated fluid-seal with a matchingly-shaped glazed vitreous surface when pressed thereagainst, said ball-supporting sealing rings having axially outwardly facing pressure-receiving and fluid-sealing annular surfaces and axially inwardly-facing sphere-sealing annular surfaces and radially outwardly facing bore-sealing cylindrical annular surfaces, a generally spherical ball-like glass valve-member rotatably mounted between and supported by said ball-supporting sealing-rings, out of contact with the bore of said body-portion of the glass valve-housing, said ball-like valve-member having a fluid-passageway therethrough and having valve-stem-keying means, a non-metallic corrosion-resistant and impact-resistant valve-stem operatively extending through said bonnet-portion and through said stem-passage hole in the wall of the body-portion of the valve-housing and having an inner keying end which is keyingly interconnected with the keying means of said ball-like valve-member for rotating the latter about an axis generally coincident with the axis of the valve-stem, an outwardly facing annular sealing-seat surrounding the stem-passage-hole in said body-portion of the valve-housing near the inner end of said bonnet-portion and an operatively juxtaposed annular sealing-seat on said valve-stem and an annular stem-sealing member operatively interposed between said two sealing-seats, a valve-flange in operative juxtaposition to each end of the body-portion of said valve-housing and having fluid-sealing and shock-absorbing face juxtaposed to the end of said body-portion of the valve-housing, adjustable fastener means external to and independent of said valve-housing for pressing said valve-flanges against the opposite ends of the body-portion of the valve-housing and for maintaining said body-portion under axial compression and for pressing said valve-flanges against the ball-supporting sealing-rings within said body-portion so as to form a fluid-seal between said valve-flanges and the ends of said body-portion of the valve-housing and for forming a fluid-seal between said valve-flanges and said ball-supporting sealing-rings and for forming a fluid-seal between the latter and the spherical surface of the aforementioned ball-like valve-member and for forming a fluid-seal between the aforementioned ball-supporting sealing-rings and the bore of the body-portion of said valve-housing, a yoke extending across and in operative alignment with said bonnet-portion of the valve-housing and having a stem-passage hole therethrough through which said valve-stem extends, said yoke bridging across said pair of valve-flanges and fastener means for adjustably securing the ends of said yoke to the respective valve-flanges for exerting a variable axially inward force upon said valve-stem.

22. A valve for use in a pipe-line including spaced-apart pipe-ends and pipe-flanges on each of said pipe-ends, each of said pipe-flanges having fluid passageways therethrough, said valve being adapted to be operatively mounted between said pipe-ends and said pipe-flanges, said valve including a relatively short generally circularly cylindrical tubular silicate-glass valve-housing open at its opposite ends, the interior of said valve-housing constituting a valve-chamber, a valve-stem-passage hole through the wall of said valve-housing, a pair of oppositely facing ball-supporting sealing-rings operatively disposed in the opposite ends of the bore of said valve-housing, formed of a generally form-retaining and generally non-seizing and generally chemically-inert and solvent-resistant synthetic-resin having substantial chemical and physical stability and capable of being resiliently deformed under pressure and of forming an unlubricated fluid-seal with a matchingly-shaped glazed vitreous surface when pressed thereagainst, said ball-supporting sealing-rings having axially outwardly facing pressure-receiving and fluid-sealing annular surfaces and radially outwardly facing bore-sealing cylindrical annular surfaces, a generally spherical ball-like valve-member rotatably mounted between and supported by said ball-supporting sealing-rings, out of contact with the bore of said glass valve-housing, said ball-like valve-member having a fluid-passageway therethrough and having valve-stem-keying means, a non-metallic corrosion-resistant and impact-resistant valve-stem operatively extending through said stem-passage-hole in the wall of the valve-housing and having an inner keying end which is keyingly interconnected with the keying means of said ball-like valve-member for rotating the latter about an axis generally coincident with the axis of the valve-stem, an outwardly facing annular sealing-seat surrounding the stem-passage hole in said valve-housing and an operatively juxtaposed annular sealing-seat on said valve-stem and an annular stem-sealing member operatively interposed between said two sealing-seats, a pair of valve-flanges with one valve-flange in operative juxtaposition to each end of said valve-housing and each of said valve-flanges having inner and outer fluid-sealing and shock-absorbing faces juxtaposed, respectively, to the ends of said valve-housing and to the aforementioned pipe-ends, a yoke extending across and in operative alignment with said stem-passage-hole in the valve-housing and having a stem-passage hole therethrough through which said valve-stem extends, said yoke bridging across said pair of valve-flanges, means for adjustably securing the ends of said yoke to the respective valve-flanges for exerting a variable axially inward force upon said valve-stem, adjustable pipe-connecting fasteners external to and independent of said valve-housing and interconnecting the opposite pipe-flanges for pressing the flanged pipe-ends against the outer fluid-sealing and shock-absorbing faces of the adjacent valve-flanges and for pressing the inner fluid-sealing and shock-absorbing faces of said valve-flanges against the opposite ends of the valve-housing and for maintaining said valve-housing under axial compression and for pressing said valve-flanges against the ball-supporting sealing-rings within said valve-housing so as to form a fluid-seal between said valve-flanges and the ends of said valve-housing and for forming a fluid-seal between said valve-flanges and said ball-supporting sealing-rings and for forming a fluid-seal between the latter and the spherical surface of the aforementioned ball-like valve-member and for forming a fluid-seal between the aforementioned ball-supporting sealing-rings and the bore of said valve-housing.

References Cited

UNITED STATES PATENTS

| | | | |
|---|---|---|---|
| 1,535,212 | 4/1925 | Egloff et al. | 137—340 |
| 2,945,666 | 7/1960 | Freeman et al. | 251—172 |
| 3,044,489 | 7/1962 | Raub et al. | 251—368 XR |
| 3,073,336 | 1/1963 | Johnson | 137—375 |
| 3,159,377 | 12/1964 | Samour | 251—175 |
| 3,186,681 | 6/1965 | Lowrey | 251—214 |
| 2,433,589 | 12/1947 | Adams | 137—312 XR |
| 2,893,684 | 7/1959 | Williams et al. | 251—368 XR |
| 3,326,518 | 6/1967 | Grove | 251—172 XR |
| 1,043,065 | 11/1912 | Cash | 251—315 |

FOREIGN PATENTS

| | | |
|---|---|---|
| 223,944 | 7/1910 | Germany. |
| 942,772 | 5/1956 | Germany. |
| 738,582 | 10/1955 | Great Britain. |
| 983,796 | 2/1965 | Great Britain. |

HENRY T. KLINKSIEK, Primary Examiner

U.S. Cl. X.R.

251—151, 214, 315, 368